(12) United States Patent
Hattori et al.

(10) Patent No.: US 11,320,798 B2
(45) Date of Patent: May 3, 2022

(54) RETRIEVAL SYSTEM AND MONITORING SYSTEM

(71) Applicant: Mitsubishi Electric Corporation, Tokyo (JP)

(72) Inventors: Tomohiro Hattori, Tokyo (JP); Nanaho Osawa, Tokyo (JP); Satoko Sakajo, Tokyo (JP); Yutaka Matsueda, Tokyo (JP); Hiroshi Fukunaga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 92 days.

(21) Appl. No.: 16/652,416

(22) PCT Filed: Dec. 14, 2017

(86) PCT No.: PCT/JP2017/044952
§ 371 (c)(1),
(2) Date: Mar. 31, 2020

(87) PCT Pub. No.: WO2019/116515
PCT Pub. Date: Jun. 20, 2019

(65) Prior Publication Data
US 2020/0293012 A1 Sep. 17, 2020

(51) Int. Cl.
*G08B 21/00* (2006.01)
*G05B 19/048* (2006.01)
(Continued)

(52) U.S. Cl.
CPC .............. *G05B 19/048* (2013.01); *B66B 5/02* (2013.01); *B66B 1/3461* (2013.01); *B66B 5/0018* (2013.01); *G05B 2219/24015* (2013.01)

(58) Field of Classification Search
CPC ........ G05B 19/048; G05B 2219/24015; B66B 5/02; B66B 1/3461; B66B 5/0018
See application file for complete search history.

(56) References Cited

U.S. PATENT DOCUMENTS

2002/0059412 A1* 5/2002 Azpitarte ....... G06Q 10/063114
709/224
2002/0173970 A1* 11/2002 Hamada ................. G06Q 10/10
705/305

(Continued)

FOREIGN PATENT DOCUMENTS

JP 2010-191556 A 9/2010
JP 2013-218725 A 10/2013
(Continued)

OTHER PUBLICATIONS

Blaquez-Garcia et al., A review on outlier-anomaly detection in time series data (Year: 2020).*
(Continued)

*Primary Examiner* — Quang Pham
(74) *Attorney, Agent, or Firm* — Xsensus LLP

(57) ABSTRACT

A retrieval system includes a first storage unit (211), a second storage unit (212), a selection unit (216), an extraction unit (217), and a calculation unit (218). The second storage unit (212) stores a plurality of signal tables. The selection unit (216) selects a first use table from the plurality of signal tables. The extraction unit (217) extracts a value of each signal registered in the first use table from the first signal group and the second signal group. The calculation unit (218) calculates a similarity level between the first signal group and the second signal group.

6 Claims, 15 Drawing Sheets

(51) Int. Cl.
  *B66B 5/02*  (2006.01)
  *B66B 1/34*  (2006.01)
  *B66B 5/00*  (2006.01)

(56) References Cited

U.S. PATENT DOCUMENTS

| | | | | |
|---|---|---|---|---|
| 2003/0085079 | A1* | 5/2003 | Koehler | B66B 1/18 |
| | | | | 187/380 |
| 2004/0094366 | A1* | 5/2004 | Weinberger | B66B 5/0025 |
| | | | | 187/247 |
| 2005/0241887 | A1* | 11/2005 | Richter | B66B 5/0025 |
| | | | | 187/391 |
| 2006/0053123 | A1* | 3/2006 | Ide | G06F 16/35 |
| 2007/0272497 | A1* | 11/2007 | Kawai | B66B 5/024 |
| | | | | 187/393 |
| 2008/0123826 | A1* | 5/2008 | Hirade | B66B 5/0012 |
| | | | | 379/106.01 |
| 2008/0173502 | A1* | 7/2008 | Tyni | B66B 5/0025 |
| | | | | 187/394 |
| 2009/0049441 | A1* | 2/2009 | Mii | B66B 1/3407 |
| | | | | 717/173 |
| 2009/0321190 | A1* | 12/2009 | Kawai | B66B 5/024 |
| | | | | 187/247 |
| 2010/0236868 | A1* | 9/2010 | Hikita | B66B 5/021 |
| | | | | 187/247 |
| 2011/0067958 | A1* | 3/2011 | Schuster | B66B 5/0006 |
| | | | | 187/393 |
| 2012/0041575 | A1* | 2/2012 | Maeda | G05B 23/024 |
| | | | | 700/79 |
| 2012/0145488 | A1* | 6/2012 | Nakashima | B66B 1/468 |
| | | | | 187/389 |
| 2014/0008155 | A1* | 1/2014 | Rossignol | B66B 1/302 |
| | | | | 187/290 |
| 2017/0140287 | A1* | 5/2017 | Moriyama | G05B 13/04 |
| 2017/0355554 | A1* | 12/2017 | Eleid | B66B 1/2458 |
| 2017/0369275 | A1* | 12/2017 | Saraswat | B66B 1/3407 |
| 2018/0305175 | A1* | 10/2018 | Bruno | B66B 3/002 |
| 2018/0370759 | A1* | 12/2018 | Hattori | B66B 1/3461 |
| 2019/0112151 | A1* | 4/2019 | Hattori | G08B 31/00 |
| 2020/0122959 | A1* | 4/2020 | Sakakura | B66B 1/2491 |

FOREIGN PATENT DOCUMENTS

| | | | |
|---|---|---|---|
| JP | 2016-157361 A | | 9/2016 |
| JP | 2016157361 A | * | 9/2016 |
| JP | 2017-033437 A | | 2/2017 |
| WO | WO-2013051619 A1 | * | 4/2013 ........... G06K 9/6215 |
| WO | 2017/158684 A1 | | 9/2017 |
| WO | 2018/109929 A1 | | 6/2018 |

OTHER PUBLICATIONS

Goldstein et al., A Comparative Evaluation of Unsupervised Anomaly Detection Algorithms for Multivariate Data (Year: 2016).*
Hayes et al., Contextual Anomaly Detection in Big Sensor Data (Year: 2014).*
Marti et al., Anomaly Detection Based on Sensor Data in Petroleum (Year: 2015).*
Akbar et al., Analysis Relates to the Causes of Damage on the OOG Elevator through Failure Mode Effect Analysis Method (Year: 2021).*
International Search Report and Written Opinion dated Mar. 6, 2018 for PCT/JP2017/044952 filed on Dec. 14, 2017, 10 pages including English Translation of the International Search Report.

* cited by examiner

Fig. 2

[TRACE DATA NO.1]
1111111,001,01,01,20110801120537,20130328091574,11111111 11111111,
00000000 00000000,11111111 11111111,00000000 00000000,11111111 11111111,
11111111 11111111,---0000,0000,005DF5,7FFFFF,01,

[TRACE DATA NO.2]
2222222,001,01,01,20110804162137,20130328091804,11111111 11111111,
00000000 00000000,11111111 11111111,00000000 00000000,11111111 11111111,
11111111 11111111,---0000,0000,006557,7FFFFF,01,

[TRACE DATA NO.3]
3333333,015,03,03,20110804162153,20130328091822,11111111 11111111,
00000000 00000000,11111100 11111111,00000000 00000000,11111111 11111111,
11111111 11111111,---0000,0000,0013F2,7FFFFF,01,

[TRACE DATA NO.4]
4444444,001,01,01,20110804192145,20130328091837,11111111 11111111,
00000000 00000000,11111111 11111111,00000000 00000000,11111111 11111111,
11111111 11111111,---0000,0000,0070D5,7FFFFF,01,

S101: RECEIVE TRACE DATA
S102: STORE TRACE DATA

S201: SELECT FIRST USE TABLE
S202: EXTRACT SIGNAL VALUE FROM TRACE DATA X1
S203: EXTRACT SIGNAL VALUE FROM ANOTHER TRACE DATA
S204: CALCULATE SIMILARITY LEVEL BETWEEN TRACE DATA X1 AND ANOTHER TRACE DATA
S205: SIMILARITY LEVEL HAS BEEN CALCULATED WITH RESPECT TO ALL SETS OF TRACE DATA?
S206: DISPLAY SIMILARITY LEVEL

S301: CALCULATE SIMILARITY LEVEL OF EACH SIGNAL
S302: READ IMPORTANCE OF EACH SIGNAL
S303: CALCULATE SIMILARITY LEVEL
    BETWEEN TRACE DATA X1 AND ANOTHER TRACE DATA

Fig. 7

BUILDING NUMBER: 1234　　　ELEVATOR No. :001
BUILDING NAME　 : WW BUILDING
MODEL　 :5678-9
DATE AND TIME OF OCCURRENCE: 2014/12/24 14:21:08

| BUILDING NUMBER | DATE AND TIME OF OCCURRENCE | SIMILARITY LEVEL | RESPONSE DESCRIPTION |
|---|---|---|---|
| 1111 | 2010/05/11 11:52:05 | 95.8% | REPLACE X DUE TO ABNORMALITY IN BOARD |
| 2222 | 2012/01/17 10:43:55 | 92.1% | AS CONNECTION BY CONNECTOR IS UNNECESSARY ... |
| 3333 | 2012/09/16 19:22:09 | 84.3% | POWER OUTAGE |
| 4444 | 2009/12/29 16:31:41 | 77.7% | ABNORMALITY IN Y BOARD |
| 5555 | 2013/07/26 06:12:45 | 76.9% | CARRY OUT Z DUE TO FAULTY CONNECTION |

S401: CLASSIFY SETS OF TRACE DATA INTO GROUPS
S402: DETERMINE REPRESENTATIVE VALUE OF EACH SIGNAL WITH RESPECT TO EACH GROUP
S403: CREATE SIGNAL TABLE FOR EACH GROUP

S501: CLASSIFY SETS OF TRACE DATA INTO GROUPS
S502: DETERMINE REPRESENTATIVE VALUE OF EACH SIGNAL WITH RESPECT TO EACH GROUP
S503: CREATE FIRST SELECTION CRITERIA FOR EACH GROUP

S601: SELECT FIRST USE TABLE
S602: SELECT SECOND USE TABLE
S603: EXTRACT SIGNAL VALUE FROM TRACE DATA X1
S604: EXTRACT SIGNAL VALUE FROM ANOTHER TRACE DATA
S605: CALCULATE SIMILARITY LEVEL BETWEEN TRACE DATA X1 AND ANOTHER TRACE DATA
S606: SIMILARITY LEVEL HAS BEEN CALCULATED WITH RESPECT TO ALL SETS OF TRACE DATA REGISTERED IN SECOND USE TABLE?
S607: DISPLAY SIMILARITY LEVEL

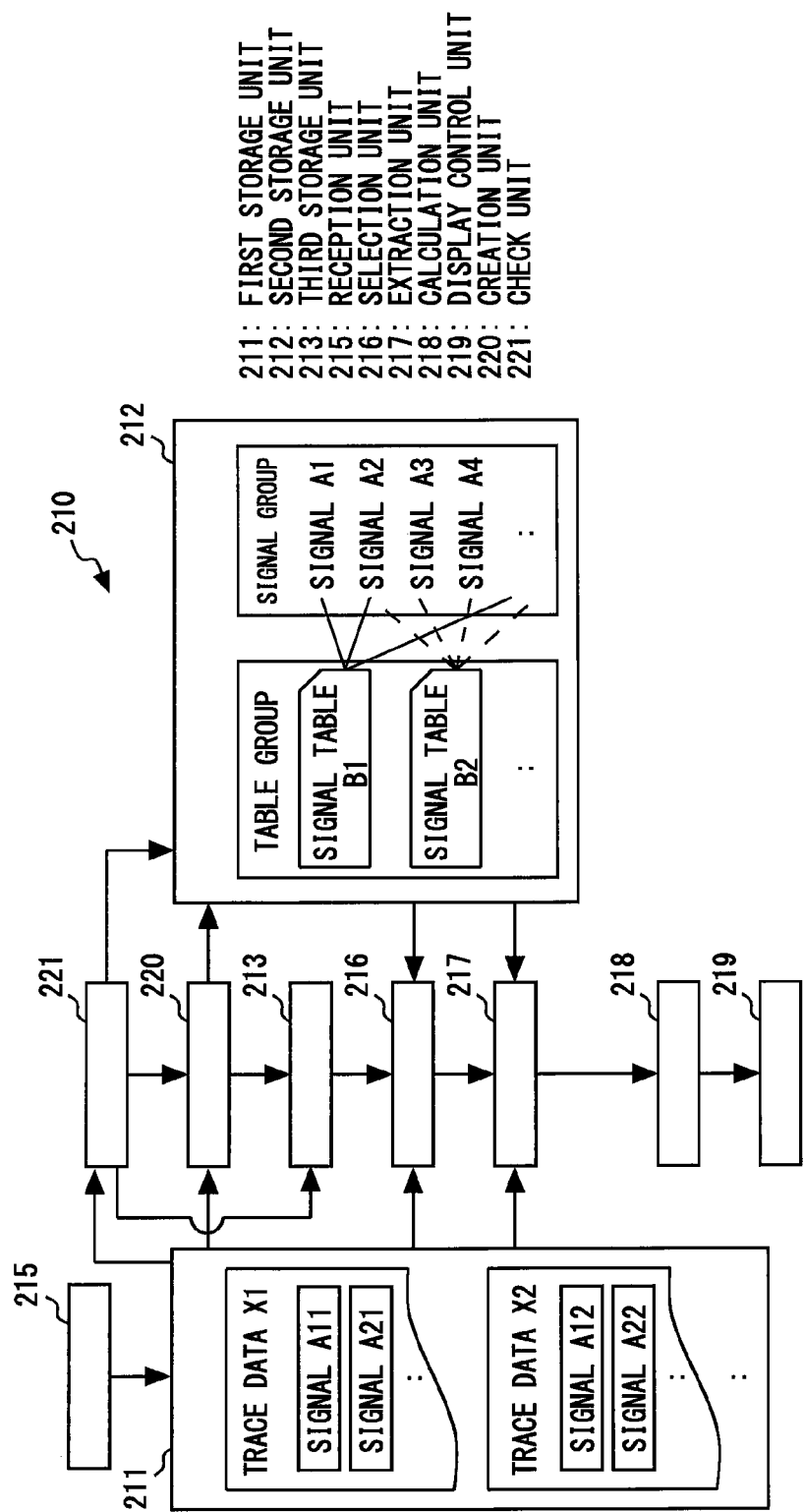

Fig. 14

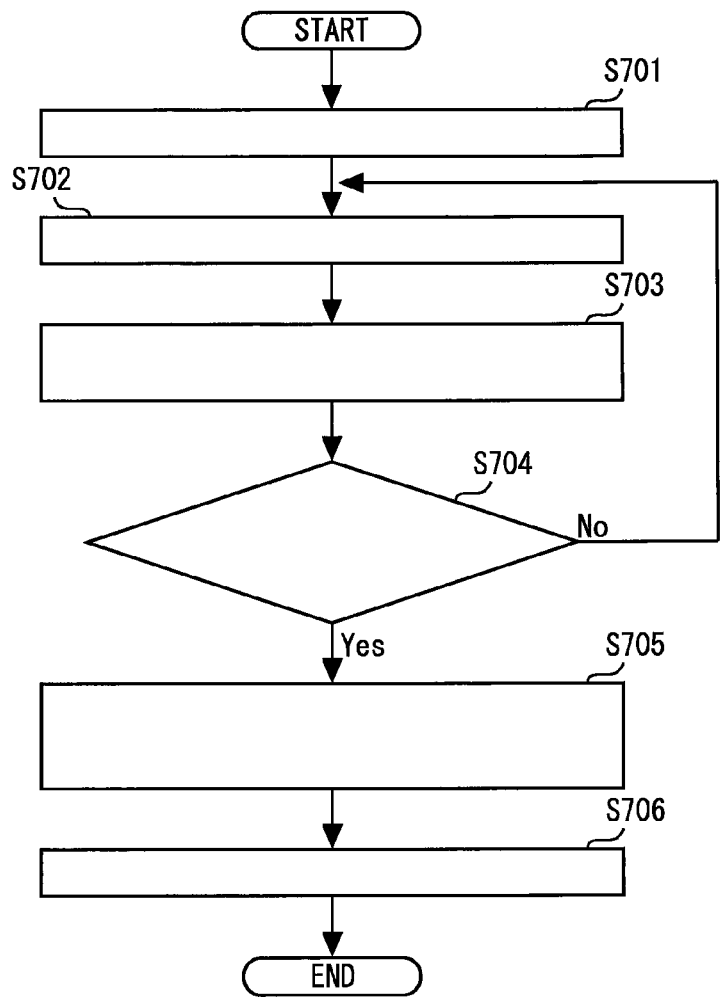

S701: EXTRACT SIGNAL VALUE FROM TRACE DATA X1
S702: EXTRACT SIGNAL VALUE FROM ANOTHER TRACE DATA
S703: CALCULATE SIMILARITY LEVEL BETWEEN TRACE DATA X1 AND ANOTHER TRACE DATA
S704: SIMILARITY LEVEL HAS BEEN CALCULATED WITH RESPECT TO ALL SETS OF TRACE DATA?
S705: COMPARE SIMILARITY LEVEL CALCULATED BY USING SOME SIGNALS AND SIMILARITY LEVEL CALCULATED BY USING ALL SIGNALS
S706: ADJUST TARGET SIGNAL TABLE

RETRIEVAL SYSTEM AND MONITORING SYSTEM

CROSS-REFERENCE TO RELATED APPLICATION

The present application is based on PCT filing PCT/JP2017/044952, filed Dec. 14, 2017, the entire contents of which are incorporated herein by reference.

FIELD

The present invention relates to a retrieval system and a monitoring system including the retrieval system.

BACKGROUND

A retrieval system is described in PTL 1. In the system described in PTL 1, a similarity level between a first signal group and a second signal group is calculated. The first signal group and the second signal group each include a plurality of signals. In the system described in PTL 1, firstly, a similarity level is calculated for each signal. A similarity level between the first signal group and the second signal group is calculated in accordance with the similarity level of each signal and a preset importance of each signal.

CITATION LIST

Patent Literature

[PTL 1] JP 2017-33437 A

SUMMARY

Technical Problem

In the system described in PTL 1, it is impossible to select, depending on the first signal group, signals to be used for calculating a similarity level between the signal groups. Additionally, in the case in which a plurality of second signal groups exist, it is impossible to select, depending on the first signal group, a second signal group to calculate a similarity level with regard to the first signal group. This leads to a problem in which unnecessary calculation performed to compute the similarity level increases and the system thus operates under heavy load conditions.

The present invention is made to solve the problem described above. An object of the present invention is to provide a retrieval system that can decrease load when a similarity level between signal groups is calculated. Another object of the present invention is to provide a monitoring system including a retrieval system having such a function.

Solution to Problem

A retrieval system of the present invention comprises first storage means for storing a second signal group including particular kinds of signals included in a first signal group, second storage means for storing a plurality of signal tables in each of which some of the particular kinds of signals are registered, selection means for selecting a first use table from the plurality of signal tables in accordance with a value of a signal included in the first signal group, extraction means for extracting, from the first signal group and the second signal group, a value of each signal registered in the first use table, and calculation means for calculating a similarity level between the first signal group and the second signal group in accordance with the value of each signal extracted from the first signal group by the extraction means and the value of each signal extracted from the second signal group by the extraction means.

A monitoring system of the present invention includes the retrieval system. The monitoring system comprises an elevator, and a data center that includes second calculation means and that is capable of communicating with the elevator. The elevator includes a control panel for controlling movement of a car, a monitoring device coupled to the control panel, and a communication device that is coupled to the monitoring device and that communicates with the data center. The monitoring device includes the selection means, the extraction means, and the calculation means. The second calculation means calculates a similarity level between the first signal group and the second signal group in accordance with a value of each signal of the particular kinds of signals included in the first signal group and a value of each signal of the particular kinds of signals included in the second signal group.

A monitoring system of the present invention includes the retrieval system. The monitoring system comprises an elevator, a data center that includes second calculation means and that is capable of communicating with the elevator, and an information center that is capable of communicating with the data center and in which an operator is present. The information center includes the selection means, the extraction means, and the calculation means. The second calculation means calculates a similarity level between the first signal group and the second signal group in accordance with a value of each signal of the particular kinds of signals included in the first signal group and a value of each signal of the particular kinds of signals included in the second signal group.

A monitoring system of the present invention includes the retrieval system. The monitoring system comprises an elevator, a data center that is capable of communicating with the elevator, and an information center that is capable of communicating with the data center and in which an operator is present. The data center includes the selection means, the extraction means, and the calculation means. The information center includes second selection means having a function identical to a function of the selection means, second extraction means having a function identical to a function of the extraction means, and second calculation means having a function identical to a function of the calculation means. A signal table different from a signal table included in the data center is included in the information center.

A retrieval system of the present invention comprises first storage means for storing a plurality of signal groups each including particular kinds of signals included in a first signal group, fourth storage means for storing a plurality of group tables in each of which some of the plurality of signal groups are registered, selection means for selecting a use table from the plurality of group tables in accordance with a value of a signal included in the first signal group, extraction means for extracting a value of each signal of the particular kinds of signals from the first signal group and individual signal groups registered in the use table, and calculation means for calculating, in accordance with the value of each signal extracted from the first signal group by the extraction means and the value of each signal extracted by the extraction means from a particular signal group of the signal groups registered in the use table, a similarity level between the first signal group and the particular signal group registered in the use table. The calculation means calculates a similarity level of the first signal group with respect to each of the signal groups registered in the use table.

Advantageous Effects of Invention

For example, in the retrieval system according to the present invention, the second storage means stores a plurality of signal tables. Furthermore, the extraction means extracts a value of each signal registered in the first use table from the first signal group and the second signal group. The calculation means calculates a similarity level between the first signal group and the second signal group in accordance with the value of each signal extracted from the first signal group by the extraction means and the value of each signal extracted from the second signal group by the extraction means. The present invention can decrease load when the similarity level of signal group is calculated.

BRIEF DESCRIPTION OF DRAWINGS

FIG. 2 is an illustration depicting an example of trace data.

FIG. 7 is an illustration depicting an example of display of display device.

FIG. 13 is a diagram illustrating an example of the server according to an embodiment 3.

FIG. 14 is a flowchart illustrating an example of an operation of the retrieval system according to the embodiment 3.

DESCRIPTION OF EMBODIMENTS

Figure 1:
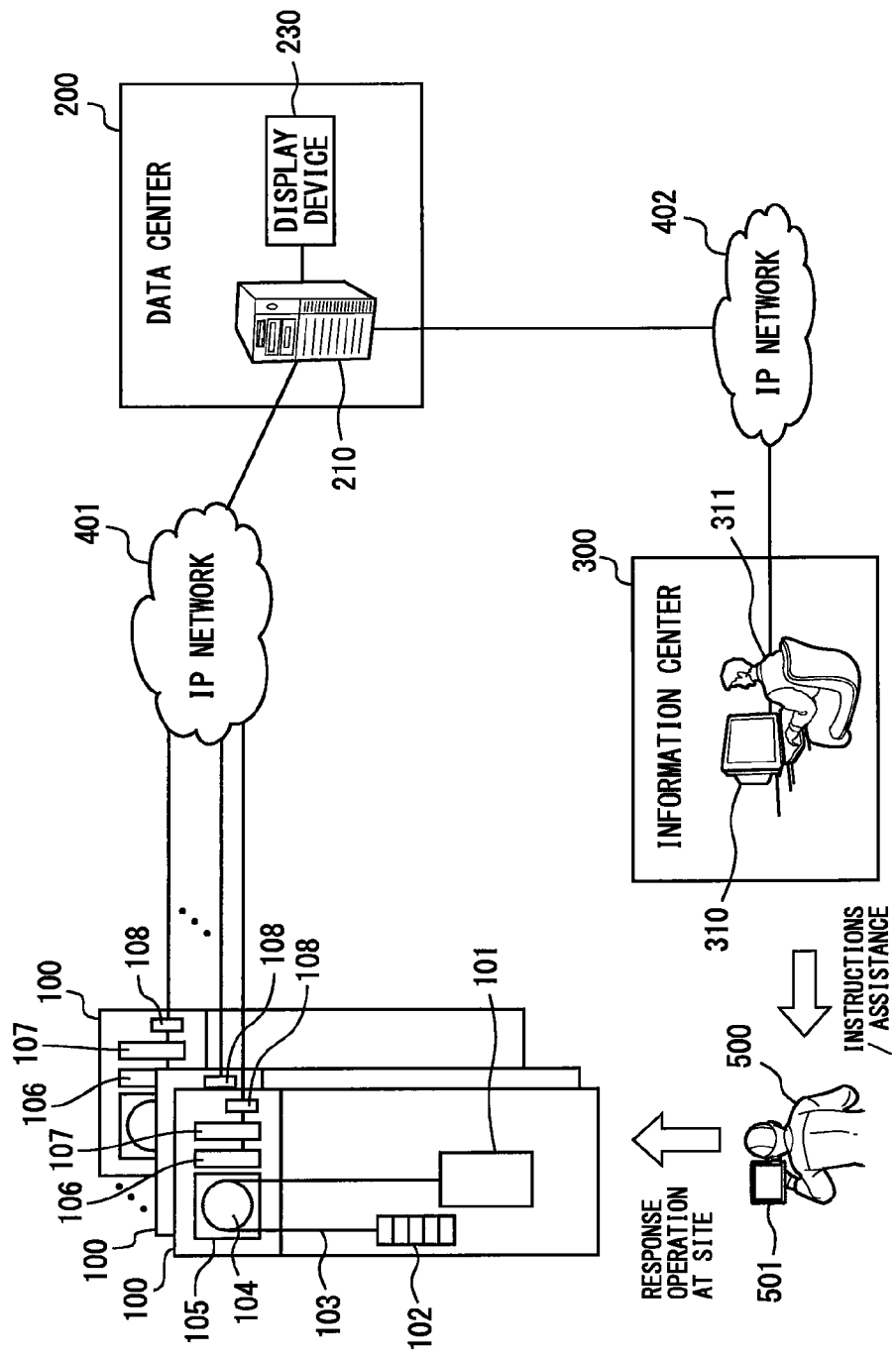
FIG. 1 is an illustration depicting an example of a retrieval system according to an embodiment 1.

The present invention is described with reference to the accompanying drawings. Redundant descriptions are simplified or omitted as appropriate. In each of the drawings, the same reference characters indicate the same or corresponding parts.

Embodiment 1

FIG. 1 is an illustration depicting an example of a retrieval system according to an embodiment 1. FIG. 1 illustrates an example in which this retrieval system is included in a monitoring system that monitors elevators. The monitoring system illustrated in FIG. 1 includes elevators 100, a data center 200, and an information center 300. The data center 200 includes a server 210 and a display device 230. The information center 300 includes a monitoring terminal 310.

The data center 200 can communicate with the elevators 100. For example, the server 210 communicates with the many remote elevators 100 via an IP network 401. The data center 200 can communicate with the information center 300. For example, the server 210 communicates with the monitoring terminal 310 via an IP network 402. In the present embodiment, the IP networks are communication networks employing the Internet Protocol (IP) as the communication protocol. For example, the IP network 401 is a closed network. The IP network 402 is a closed network. Instead of the IP networks 401 and 402, an open network may be used.

FIG. 1 illustrates an example in which the data center 200 and the information center 300 are situated apart from each other. The server 210 and the monitoring terminal 310 may be included in one center. When the data center 200 and the information center 300 are situated apart from each other, it is desired that the information center 300 is established in a country in which the elevators 100 are situated. For example, the information center 300 is established in each area in which the elevators 100 are situated.

The data center 200 may be established in a country in which the elevators 100 are situated or a country other than the country in which the elevators 100 are situated. For example, the data center 200 situated in Japan may communicate with the elevators 100 situated in different countries. When the elevators 100 are situated in a plurality of countries, it is desired that the information centers 300 are established in respective countries in which the elevators 100 are situated.

The elevators 100 each include, for example, a car 101 and a counterweight 102. The car 101 and the counterweight 102 are hung in a shaft by using a main rope 103. A traction machine includes a driving sheave 104 and a motor 105. The main rope 103 is wound around the driving sheave 104. The motor 105 drives the driving sheave 104. A control panel 106 controls the motor 105. This means that the control panel 106 controls the movement of the car 101. A monitoring device 107 is coupled to the control panel 106. A communication device 108 is coupled to the monitoring device 107.

When a failure in the elevator 100 occurs, a snapshot of signal values indicating the state of the elevator 100 is obtained. In the present embodiment, the snapshot of signal values is referred to as trace data. When a failure in the elevator 100 occurs, the monitoring device 107 collects trace data from, for example, the control panel 106.

The trace data is an example of a signal group including particular kinds of signals. For example, the trace data includes a signal identifying the elevator 100. The trace data includes a signal representing a time. The trace data includes a signal representing a current value of the control panel 106. The trace data includes a signal representing a voltage value of the control panel 106. The trace data includes a signal representing a speed of the motor 105. The trace data includes a signal representing torque of the motor 105. The trace data includes a signal representing an open or closed state of a door. The trace data includes a signal representing a position of the car 101. The trace data includes a signal representing an operational status of a safety device. Signals included in the trace data are not limited to these examples.

One or some of the signals described as examples may be excluded from the trace data. The trace data may include another signal.

FIG. 2 is an illustration depicting an example of trace data. FIG. 2 depicts an example of four sets of trace data. The notation of signals included in trace data is not limited to one type. For example, a signal expressed in binary, a signal expressed in hexadecimal, and a signal expressed in decimal may be all included in one set of trace data. One set of trace data may include signals of various signal lengths.

When a failure in the elevator 100 is detected, the monitoring device 107 collects trace data at the time at which the failure is detected. The monitoring device 107 may collect trace data for a fixed time period before and after the time at which a failure is detected. The time to collect trace data is not limited to the time at which a failure is detected. The monitoring device 107 may regularly collect trace data.

The communication device 108 is a communication interface of the elevator 100. The communication device 108 communicates with the server 210 in the data center 200 via the IP network 401. The communication device 108 transmits to the server 210 trace data collected by the monitoring device 107.

Figure 3:
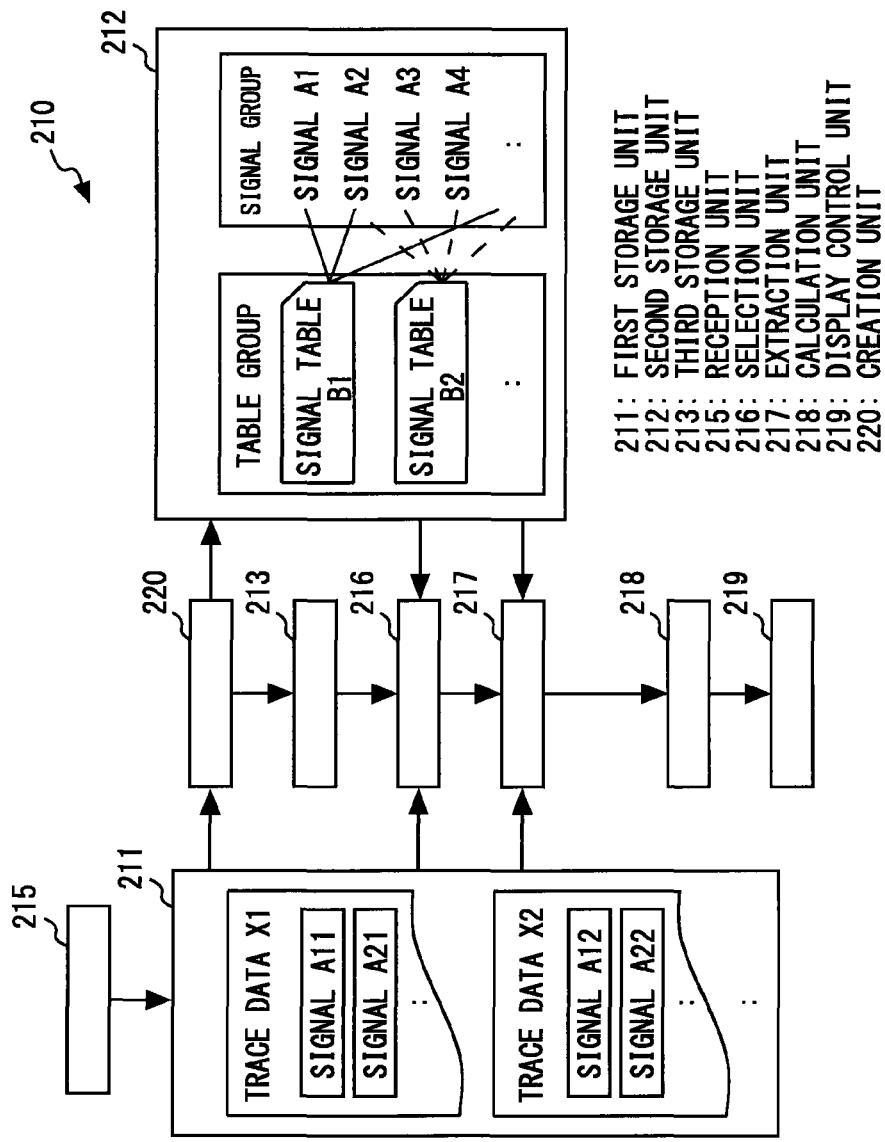
FIG. 3 is a diagram illustrating an example of a server.
Figure 4:
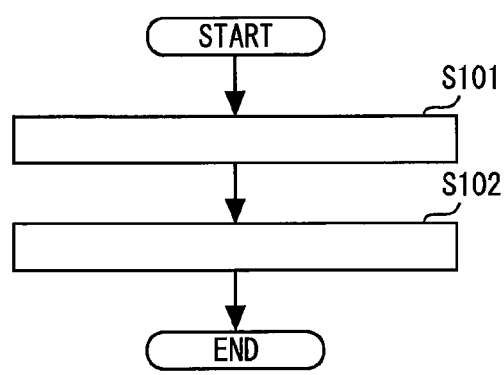
FIG. 4 is a flowchart illustrating an example of an operation of the retrieval system according to the embodiment 1.

FIG. 3 is a diagram illustrating an example of the server 210. The server 210 includes, for example, a first storage unit 211, a second storage unit 212, and a third storage unit 213. The server 210 also includes a reception unit 215, a selection unit 216, an extraction unit 217, a calculation unit 218, and a display control unit 219. Hereinafter, also referring to FIGS. 4 to 10, functions and operations of this retrieval system are described. FIG. 4 is a flowchart illustrating an example of an operation of the retrieval system according to the embodiment 1.

As described above, when a failure in the elevator 100 occurs, the monitoring device 107 collects trace data. The trace data collected by the monitoring device 107 is transmitted from the communication device 108 to the server 210.

The reception unit 215 receives the trace data transmitted from the communication device 108 (S101). The first storage unit 211 stores the trace data received by the reception unit 215 (S102). Many sets of trace data are accumulated in the first storage unit 211.

Figure 5:
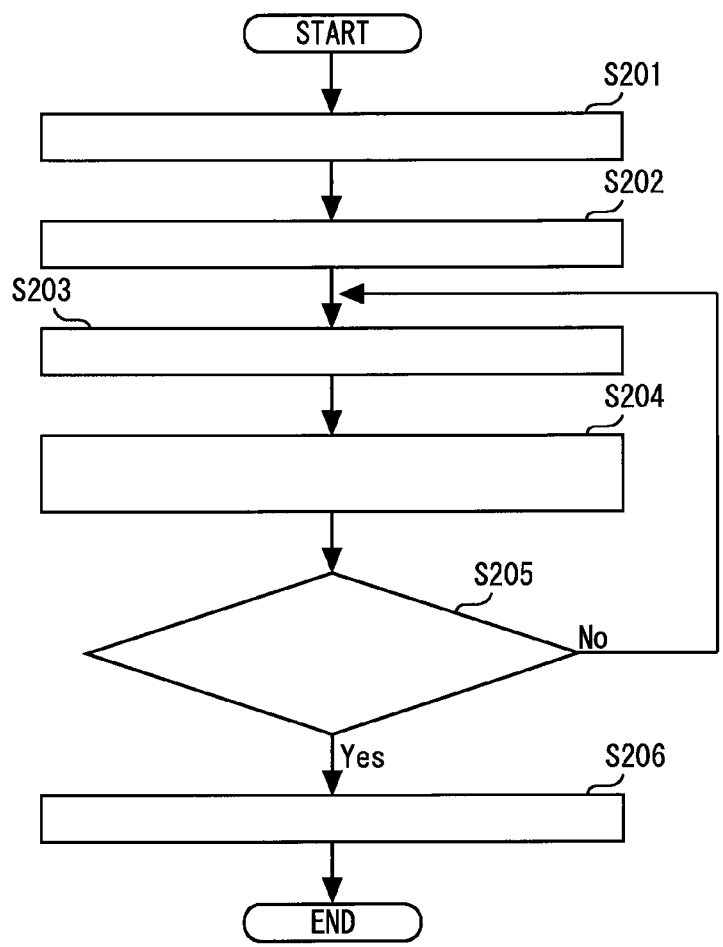
FIG. 5 is a flowchart illustrating an example of another operation of the retrieval system according to the embodiment 1.

FIG. 5 is a flowchart illustrating an example of another operation of the retrieval system according to the embodiment 1. FIG. 5 depicts an example in which trace data similar to trace data X1 is retrieved. The trace data X1 is a set of trace data stored in the first storage unit 211. The trace data X1 is, for example, the latest trace data stored in the first storage unit 211. The processing flow illustrated in FIG. 5 starts upon, for example, storing new trace data in the first storage unit 211.

Each set of trace data stored in the first storage unit 211 includes particular kinds of signals. For example, each set of trace data includes a signal A1, a signal A2, a signal A3, ..., and a signal AN. N is a natural number equal to or greater than, for example, 3. N may be a natural number equal to or greater than 1000. In the following description, the signal A1 included in the trace data X1 is referred to as a signal A11. Similarly, the signal A2 included in the trace data X1 is referred to as a signal A21. The signal A3 included in the trace data X1 is referred to as a signal A31. The signal AN included in the trace data X1 is referred to as a signal AN1.

Firstly, the selection unit 216 selects a signal table to be used when a similarity level is calculated (S201). Hereinafter, the signal table used when the similarity level is calculated is also referred to as a "first use table". The second storage unit 212 stores a plurality of signal tables. The signal table is a table used for specifying signals to be used when the similarity level is calculated. For example, the second storage unit 212 previously stores signal tables for individual causes of failure. As described above, trace data includes the particular kinds of signals. Some of the particular kinds of signals included in trace data are registered in each signal table. For example, the combination of signals registered in a signal table varies among signal tables. The selection unit 216 selects as the first use table a signal table from the plurality of signal tables stored in the second storage unit 212. The selection unit 216 may select a plurality of signal tables as the first use tables.

The third storage unit 213 stores first selection criteria. The first selection criteria are standards used when the selection unit 216 selects the first use table. The selection unit 216 selects the first use table in accordance with, for example, a value of a particular signal included in the trace data X1 and the first selection criteria stored in the third storage unit 213. Table 1 indicates an example of the first selection criteria.

TABLE 1

| First selection criteria | Use table |
|---|---|
| A1 = 0 | Signal table B1 |
| A1 = 1 | Signal table B2 |
| A1 = 2 and A2 = 0 | Signal table B3 |
| Other | Signal table B4 |

In the example indicated by Table 1, when the value of the signal A1 of the trace data X1 is 0, the selection unit 216 selects a signal table B1 as the first use table in S201. When the value of the signal A1 of the trace data X1 is 1, the selection unit 216 selects a signal table B2 as the first use table. When the value of the signal A1 of the trace data X1 is 2 and the value of the signal A2 of the trace data X1 is 0, the selection unit 216 selects a signal table B3 as the first use table. When the selection unit 216 cannot select any of the signal tables B1 to B3 as the use table, the selection unit 216 selects a signal table B4 as the first use table.

Next, the extraction unit 217 extracts from trace data the values of signals to be used when the similarity level is calculated. Firstly, the extraction unit 217 extracts from the trace data X1 the value of each signal registered in the first use table (S202). The signals of which the extraction unit 217 extracts values in S202 are some of the signals included in the trace data X1.

Next, the extraction unit 217 selects a particular set of trace data other than the trace data X1 from sets of trace data stored in the first storage unit 211. For example, the extraction unit 217 selects trace data X2 from the first storage unit 211.

The trace data X2 includes a signal A1, a signal A2, a signal A3, ..., and a signal AN. In the following description, the signal A1 included in the trace data X2 is referred to as a signal A12. Similarly, the signal A2 included in the trace data X2 is referred to as a signal A22. The signal A3 included in the trace data X2 is referred to as a signal A32. The signal AN included in the trace data X2 is referred to as a signal AN2. The signal A12 is a signal corresponding to the signal A11. The signal A22 is a signal corresponding to the signal A21. The signal A32 is a signal corresponding to the signal A31. The signal AN2 is a signal corresponding to the signal AN1.

The extraction unit 217 extracts from the selected trace data X2 the value of each signal registered in the first use table (S203). The signals of which the extraction unit 217 extracts values in S203 are some of the signals included in the trace data X2. The kinds of signals of which the extraction unit 217 extracts values in S203 are identical to the kinds of signals of which the extraction unit 217 extracts values from the trace data X1 in S202.

Figure 6:
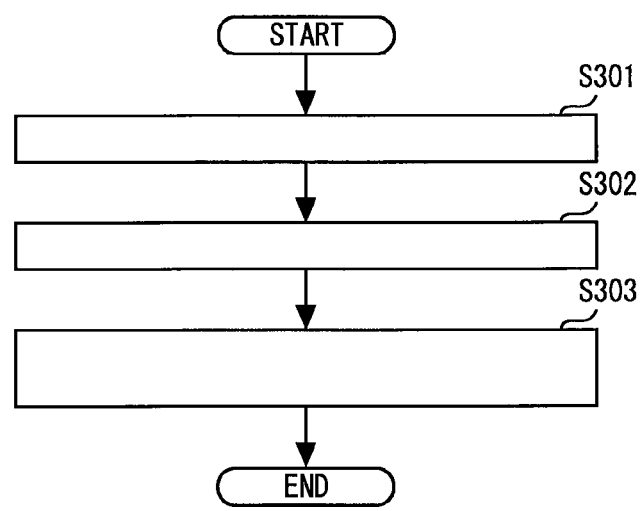
FIG. 6 is a flowchart illustrating an example of calculation of a similarity level.

The calculation unit 218 calculates a similarity level between the trace data X1 and the trace data selected in S203 (S204). For example, the calculation unit 218 calculates a similarity level between the trace data X1 and the trace data X2. The calculation unit 218 calculates the similarity level in accordance with the value of each signal extracted from the trace data X1 by the extraction unit 217 in S202 and the value of each signal extracted from the trace data X2 by the extraction unit 217 in S203. FIG. 6 is a flowchart illustrating an example of calculation of the similarity level. FIG. 6 indicates details of the processing performed in S204.

The calculation unit 218 calculates, with respect to each pair of corresponding signals, a similarity level between a signal of which the extraction unit 217 extracts a value from the trace data X1 and a signal of which the extraction unit 217 extracts a value from the trace data X2 (S301). For example, the case in which the extraction unit 217 extracts the value of the signal A1, the value of the signal A2, the value of a signal A5, . . . is considered. In this case, the calculation unit 218 calculates a similarity level between the signal A11 and the signal A12. The calculation unit 218 calculates a similarity level between the signal A21 and the signal A22. The calculation unit 218 calculates a similarity level between a signal A51 and a signal A52. The calculation unit 218 similarly calculates a similarity level with regard to other signals. The calculation unit 218 may calculate the similarity level with respect to each signal by employing Dynamic programming (DP matching) mentioned in PTL 1.

For example, the first storage unit 211 stores an importance of each signal included in trace data. In the example indicated in the present embodiment, the trace data includes the signal A1, the signal A2, the signal A3, . . . , and the signal AN. Thus, the first storage unit 211 stores an importance of the signal A1, an importance of the signal A2, an importance of the signal A3, . . . , and an importance of the signal AN. The calculation unit 218 reads from the first storage unit 211 the importance of each signal of which the similarity level has been calculated in S301 (S302). In the example described above, the calculation unit 218 reads from the first storage unit 211 the importance of the signal A1, the importance of the signal A2, and the importance of the signal A5, and so on.

The calculation unit 218 calculates a similarity level between the trace data X1 and the trace data X2 in accordance with the calculated similarity level of each signal and the read importance of each signal (S303). For example, the calculation unit 218 calculates the similarity level such that the calculation unit 218 calculates the product of the similarity level and the importance with respect to each signal and adds the products together.

(The similarity level between the trace data X1 and the trace data X2)=(the similarity level of the signal A1)×(the importance of the signal A1)+ (the similarity level of the signal A2)×(the importance of the signal A2)+(the similarity level of the signal A5)×(the importance of the signal A5)

The method employed by the calculation unit 218 to calculate the similarity level is not limited to the example described above. The maximum value of similarity level calculated by the calculation unit 218 may be set at, for example, 1 or 100. The calculation unit 218 may calculate the similarity level between the trace data X1 and the trace data X2 by employing a method identical to the method described in PTL 1. In this case, the calculation unit 218 calculates a similarity level of each signal in S301 and then calculates a similarity level between the trace data X1 and the trace data X2 in accordance with the calculated similarity level of each signal. For example, the calculation unit 218 calculates a distance L between the trace data X1 and the trace data X2 by using the following equation. $L_i$ is a calculated similarity level of a signal i. N is the number of signals of which similarity levels are calculated.

[Math. 1]

$$L = \sqrt{\frac{\sum L_i^2}{N+1}} \quad (1)$$

By using the distance L calculated in accordance with Equation 1, the calculation unit 218 calculates a similarity level $P_{match}$ between the trace data X1 and the trace data X2 in accordance with the following equation.

[Math. 2]

$$P_{match} = \frac{(L_{max} - L)}{L_{max}} \times 100 \quad (2)$$

As described above, the first storage unit 211 stores many sets of trace data. For example, the first storage unit 211 stores the trace data X1, the trace data X2, trace data X3, . . . , and trace data XM. M is a natural number equal to or greater than, for example, 3. After a similarity level between the trace data X1 and a set of trace data is calculated, it is determined whether the similarity level is calculated with respect to all sets of trace data (S205). When a similarity level between a particular set of trace data and the trace data X1 has not been calculated, the processing operations in S203 and S204 are performed for the particular set of trace data.

For example, after a similarity level between the trace data X1 and the trace data X2 is calculated, the extraction unit 217 extracts from the trace data X3 the value of each signal registered in the first use table (S203). The calculation unit 218 calculates a similarity level between the trace data X1 and the trace data X3 in accordance with the value of each signal extracted from the trace data X1 by the extraction unit 217 and the value of each signal extracted from the trace data X3 by the extraction unit 217 (S204).

The display control unit 219 controls the display device 230. The display control unit 219 causes the display device 230 to display the similarity level calculated by the calculation unit 218 (S206).

FIG. 7 is an illustration depicting an example of display of the display device 230. FIG. 7 depicts an example in which the display device 230 displays a set of information identifying a particular set of trace data, a similarity level calculated by the calculation unit 218, and a response description in an associated manner. In the example indicated in FIG. 7, sets of information that each identify a particular set of trace data are displayed in order starting from a set of information of which the calculated similarity level is the highest. For example, in the case in which the similarity level between the trace data X1 and the trace data X2 is the highest among the calculated similarity levels, a set of information identifying the trace data X2, the calculated similarity level, and a corresponding response description are displayed at the top row. FIG. 7 indicates an example in which information indicating the number of a building in which the elevator 100 is situated and information indicating a date and time at which a failure has occurred are displayed as a set of information identifying a particular set of trace data. The response description is information inputted after maintenance work by a maintenance staff 500 who has actually carried out the maintenance work.

In the example indicated in the present embodiment, a similarity level is calculated in accordance with the value of each signal extracted by the extraction unit 217. The extraction unit 217 does not necessarily extract the values of all signals included in trace data. As a result, it is possible to decrease load when the similarity level of trace data is calculated. According to the example indicated in the present embodiment, it is possible to retrieve trace data similar to, for example, the trace data X1 in a shorter time period.

In the present embodiment, the example in which the display device 230 included in the data center 200 displays calculation results of similarity level is described. The calculation results of similarity level may be displayed at the monitoring terminal 310 in the information center 300. An operator 311 in the information center 300 can, while viewing the display of the monitoring terminal 310, send the maintenance staff 500 to the site, and provide instructions for the maintenance staff 500 and assist the maintenance staff 500. Alternatively, the calculation results of similarity level may be displayed at a dedicated portable terminal 501 owned by the maintenance staff 500. The maintenance staff 500 can carry out response operation at the site while viewing the display of the portable terminal 501.

In the present embodiment, the example in which the display device 230 displays calculation results obtained by the calculation unit 218 is described. This is one example. For example, calculation results obtained by the calculation unit 218 may be stored in the server 210 so that the operator 311 or the maintenance staff 500 can utilize the calculation results obtained by the calculation unit 218.

Figure 8:
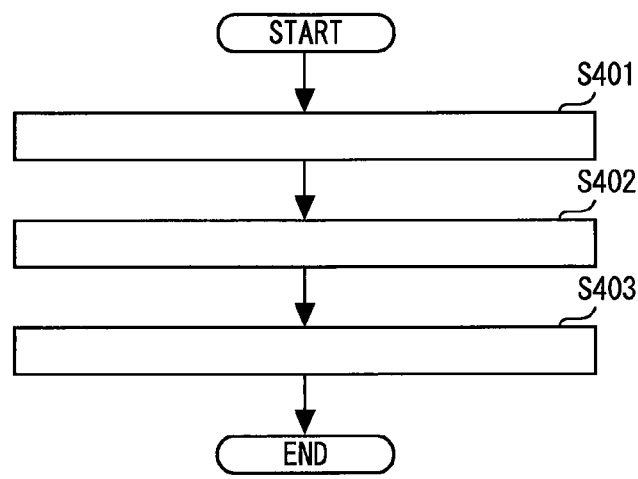
FIG. 8 is a flowchart illustrating an example of creation of a signal table.

In the present embodiment, the example in which the second storage unit 212 previously stores signal tables is described. The signal tables are stored, for example, manually by a designer of the elevator 100 or the maintenance staff 500 in the second storage unit 212. As another example, the server 210 may further include a creation unit 220. The creation unit 220 creates a signal table in accordance with a plurality of sets of trace data stored in the first storage unit 211. The second storage unit 212 stores the signal table created by the creation unit 220. FIG. 8 is a flowchart illustrating an example of creation of a signal table.

When a failure in a particular elevator 100 occurs, the communication device 108 of the particular elevator 100 transmits trace data to the server 210. The maintenance staff 500 receives instructions and assistance provided by the operator 311 and accordingly repairs the elevator 100. After completing the repair work for the elevator 100, the maintenance staff 500 inputs a response description against this failure by using the portable terminal 501. The information inputted by the maintenance staff 500 by using the portable terminal 501 is stored in the first storage unit 211 in association with the trace data having been transmitted by the particular elevator 100 when this failure has occurred. This means that each set of trace data stored in the first storage unit 211 is associated with a response description inputted by the maintenance staff 500.

Firstly, the creation unit 220 classifies a plurality of sets of trace data stored in the first storage unit 211 into a plurality of groups (S401). The creation unit 220 may identify the cause of failure in accordance with the text included in the response description and classify the trace data according to cause of failure. The creation unit 220 may classify trace data according to pattern of signal values by employing hierarchical clustering, such as the nearest neighbor method, the group average method, or Ward's method. The creation unit 220 may classify trace data according to pattern of signal values by employing non-hierarchical clustering, such as k-means. The classification of trace data in S401 may be performed manually by the maintenance staff 500.

Next, the creation unit 220 determines a representative value of each signal with respect to each group in accordance with the classification results obtained in S401 (S402).

TABLE 2

| Classification | Trace data | Signal A1 | A2 | A3 | A4 | A5 | A6 | ... |
|---|---|---|---|---|---|---|---|---|
| Board C1 | X1 | 1 | 0 | 0 | 1 | 1 | 1 | ... |
| Board C1 | X2 | 1 | 0 | 1 | 1 | 1 | 1 | ... |
| Board C2 | X3 | 0 | 0 | 0 | 0 | 0 | 1 | ... |
| Board C2 | X4 | 0 | 0 | 1 | 1 | 0 | 1 | ... |
| Board C3 | X5 | 0 | 1 | 1 | 0 | 0 | 1 | ... |
| Board C3 | X6 | 0 | 1 | 0 | 1 | 1 | 1 | ... |
| Board C4 | X7 | 0 | 1 | 0 | 0 | 0 | 1 | ... |
| Board C4 | X8 | 0 | 1 | 1 | 1 | 1 | 1 | ... |

Table 2 indicates an example in which eight sets of trace data are classified under four kinds of causes of failure in S401. For example, the trace data X1 and X2 are trace data in a group classified as data in which the cause of failure is a board C1. The trace data X3 and X4 are trace data in a group classified as data in which the cause of failure is a board C2. Trace data X5 and trace data X6 are trace data in a group classified as data in which the cause of failure is a board C3. Trace data X7 and trace data X8 are trace data in a group classified as data in which the cause of failure is a board C4. Hereinafter, for example, trace data in a group classified as data in which the cause of failure is the board C1 is also referred to as "trace data in a board C1 group". The creation unit 220 determines a representative value of a signal in accordance with, for example, the rate of occurrence of signal value.

TABLE 3

| Classification | Representative value | | | | | | |
|---|---|---|---|---|---|---|---|
| | A1 | A2 | A3 | A4 | A5 | A6 | ... |
| Board C1 | 1 | 0 | — | 1 | 1 | 1 | ... |
| Board C2 | 0 | 0 | — | — | 0 | 1 | ... |
| Board C3 | 0 | 1 | — | — | — | 1 | ... |
| Board C4 | 0 | 1 | — | — | — | 1 | ... |

Table 3 indicates an example of representative values determined by the creation unit 220. As indicated in Table 2, the value of the signal A1 of the trace data X1 is 1. The value of the signal A1 of the trace data X2 is 1. The creation unit 220 determines that the representative value of the signal A1 of trace data in the board C1 group is 1. Similarly, the value of the signal A2 of the trace data X1 is 0. The value of the signal A2 of the trace data X2 is 0. The creation unit 220 determines that the representative value of the signal A2 of trace data in the board C1 group is 0.

The value of the signal A3 of the trace data X1 is 0. The value of the signal A3 of the trace data X2 is 1. The creation unit 220 determines that the representative value of the signal A3 of trace data in the board C1 group is "-". In Table 3, "-" denotes that no specific value is appropriate. The creation unit 220 also determines a representative value of each of the signals A4 to AN of trace data in the board C1 group. Similarly, the creation unit 220 determines a representative value of each signal of trace data in a board C2 group. The creation unit 220 determines a representative value of each signal of trace data in a board C3 group. The creation unit 220 determines a representative value of each signal of trace data in a board C4 group.

Table 3 indicates the simplest example in which only two sets of trace data match the board C1 group. In the case in which, for example, a hundred sets of trace data match the board C1 group, a value of a signal of which the rate of occurrence is equal to or greater than a first reference value may be determined as the representative value.

Next, the creation unit 220 creates a signal table for each group in accordance with the determination results obtained in S402 (S403).

TABLE 4

| Signal | Representative value | | | | Registry |
| --- | --- | --- | --- | --- | --- |
| | C1 | C2 | C3 | C4 | |
| A1 | 1 | 0 | 0 | 0 | Register in only signal table of board C1 |
| A2 | 0 | 0 | 1 | 1 | Register in all tables |
| A3 | — | — | — | — | Not register in any table |
| A4 | 1 | — | — | — | Register in only signal table of board C1 |
| A5 | 1 | 0 | — | — | Register in signal tables of board C1 and board C2 |
| A6 | 1 | 1 | 1 | 1 | Not register in any table |
| ⋮ | ⋮ | ⋮ | ⋮ | ⋮ | |

In the example indicated in Table 4, the creation unit 220 determines, with respect to each signal, which signal table a particular signal is registered in. For example, the creation unit 220 calculates the rate of occurrence of representative value with respect to the signal A1. Concerning the signal A1, only the representative value in the board C1 group is 1 and the representative values in other groups are all 0; in other words, concerning the signal A1, the rate of occurrence of the representative value 1 is 25% and the rate of occurrence of the representative value 0 is 75%. The creation unit 220 registers the signal A1 in the signal table of a group in which a representative value of the rate of occurrence greater than 0 and equal to or less than a second reference value is determined.

For example, the case in which the second reference value is 50% is considered. In this case, the creation unit 220 registers the signal A1 in the signal table of a group in which the representative value is 1. The creation unit 220 does not register the signal A1 in the signal tables of groups in which the representative value is 0. Specifically, the creation unit 220 registers the signal A1 in the signal table of the board C1 group. The creation unit 220 does not register the signal A1 in the signal table of the board C2 group. The creation unit 220 does not register the signal A1 in the signal table of the board C3 group. The creation unit 220 does not register the signal A1 in the signal table of the board C4 group.

Similarly, concerning the signal A2, the rate of occurrence of the representative value 1 and the rate of occurrence of the representative value 0 are both 50%. The creation unit 220 registers the signal A2 in the signal tables of all the groups. Concerning the signal A3, the rate of occurrence of the representative value 1 and the rate of occurrence of the representative value 0 are both 0. The creation unit 220 does not register the signal A3 in any of the signal tables of the groups.

Concerning the signal A4, the rate of occurrence of the representative value 1 is 25%. The rate of occurrence of the representative value 0 is 0%. The creation unit 220 registers the signal A4 in the signal table of the board C1 group. The creation unit 220 does not register the signal A4 in the signal table of the board C2 group. The creation unit 220 does not register the signal A4 in the signal table of the board C3 group. The creation unit 220 does not register the signal A4 in the signal table of the board C4 group.

Concerning the signal A5, the rate of occurrence of the representative value 1 is 25%. The rate of occurrence of the representative value 0 is 25%. The creation unit 220 registers the signal A5 in the signal table of the board C1 group. The creation unit 220 registers the signal A5 in the signal table of the board C2 group. The creation unit 220 does not register the signal A5 in the signal table of the board C3 group. The creation unit 220 does not register the signal A5 in the signal table of the board C4 group.

Concerning the signal A6, the rate of occurrence of the representative value 1 is 100%. The rate of occurrence of the representative value 0 is 0%. The creation unit 220 does not register the signal A6 in any of the signal tables of the groups. By performing similar processing for all signals, the signal tables of respective groups are created. In the case in which the second reference value is set at, for example, 25%, it is possible to reduce signals registered in signal tables.

Another example of determining a representative value of each signal for each group is described below. The following example corresponds to the processing operation in S401 and the processing operation in S402. For example, the creation unit 220 calculates similarity levels with respect to all pairs in sets of trace data stored in the first storage unit 211. Subsequently, the creation unit 220 groups into one group, for example, two sets of trace data between which the similarity level is equal to or greater than a reference value and determines a representative value of each signal with respect to each group. Next, the creation unit 220 regards as one set of trace data a group with respect to which the representative values have been determined and calculates similarity levels with respect to all pairs in sets of trace data as described above. The creation unit 220 then groups into one new group, for example, two sets of trace data between which the similarity level is equal to or greater than the reference value and determines a representative value of each signal with respect to each new group. By repeating this procedure many times, merging groups together is continued until the distance between groups reaches a distance equal to or greater than a particular distance. By performing such group merging processing, it is possible to generate a plurality of groups in which a representative value of each signal is determined as indicated in Table 3.

The group merging processing is performed during, for example, nighttime in which the load on the system is light. The merging processing does not need to be performed every time a new set of trace data is stored in the first storage unit 211. The group merging processing is performed regularly, for example, once a month. The group merging processing may be performed every time a particular number of sets of trace data are newly stored in the first storage unit 211.

In the case in which the group merging processing is not regularly performed, trace data newly stored may be caused to belong to any existing group until a subsequent merging processing is performed. For example, when trace data is newly stored in the first storage unit 211, the creation unit 220 calculates similarity levels with respect to all pairs by using signal values in the trace data and representative values in each group. The creation unit 220 causes the trace data to belong to a group of the highest similarity level. The creation unit 220 may cause the trace data to belong to a plurality of groups of similarity levels equal to or greater than a threshold. At this time, the representative values of a group to which the trace data is newly added may be updated.

The method for determining a representative value may be changed depending on the kind of signal in S402. For example, a signal value "0001" and a signal value "0011" may be deemed to be identical to each other because the representations of both signals include 1, and "1111" may be determined as the representative value. In this case, with regard to only the combination of a signal value "0000" and a signal value "0000", "0000" is determined as the representative value. In the case in which only one of the signal values is "0000", "-" is determined as the representative value. As another example, the representative value may be determined depending on the time at which the signal value changes.

Figure 9:
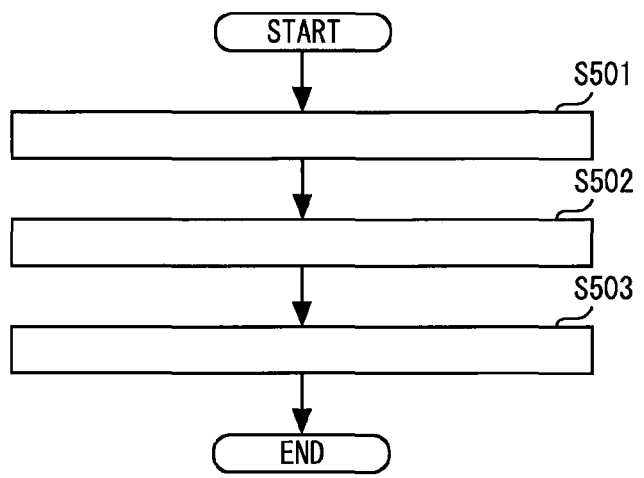
FIG. 9 is a flowchart illustrating an example of creation of first selection criteria.

In the present embodiment, the example in which the third storage unit 213 previously stores the first selection criteria is described. The first selection criteria are stored in the third storage unit, for example, manually by the designer of the elevator 100 or the maintenance staff 500. As another example, the creation unit 220 may create the first selection criteria. The creation unit 220 creates the first selection criteria in accordance with a plurality of sets of trace data stored in the first storage unit 211. The third storage unit 213 stores the first selection criteria created by the creation unit 220. FIG. 9 is a flowchart illustrating an example of creation of the first selection criteria.

The processing operations indicated as S501 and S502 in FIG. 9 are identical to the processing operations indicated as S401 and S402 in FIG. 8. The creation unit 220 firstly classifies a plurality of sets of trace data stored in the first storage unit 211 into a plurality of groups (S501). Next, the creation unit 220 determines a representative value of each signal with respect to each group in accordance with the classification results obtained in S501 (S502). In this manner, representative values for each group indicated in, for example, Table 3 can be obtained. The creation unit 220 creates the first selection criteria for each group in accordance with the determination results obtained in S502 (S503).

TABLE 5

| Classification | Representative value | | | | | | First selection criteria |
| --- | --- | --- | --- | --- | --- | --- | --- |
| | A1 | A2 | A3 | A4 | A5 | A6 | |
| Board C1 | 1 | 0 | — | 1 | 1 | 1 | A1 = 1, A2 = 0, A6 = 1 |
| Board C2 | 0 | 0 | — | — | 0 | 1 | A1 = 0, A2 = 0, A6 = 1 |
| Board C3 | 0 | 1 | — | — | — | 1 | A1 = 0, A2 = 1, A6 = 1 |
| Board C4 | 0 | 1 | — | — | — | 1 | — |

Table 5 indicates an example in which a signal of the representative value 1 or 0 with respect to all groups is used as the first selection criteria; in other words, when the representative value of a signal in a group is "-", the signal is not used as the first selection criteria. For example, the creation unit 220 creates the first selection criteria such that, when A1=1, A2=0, and A6=1, the signal table of the board C1 group is selected as the first use table. The creation unit 220 creates the first selection criteria such that, when A1=0, A2=0, and A6=1, the signal table of the board C2 group is selected as the first use table. The creation unit 220 creates the first selection criteria such that, when A1=0, A2=1, and A6=1, the signal table of the board C3 group is selected as the first use table.

In the example indicated in Table 5, the signal table of the board C3 group and the signal table of the board C4 group are identical to each other. In the example indicated in Table 5, the first selection criteria may be created such that, when the value of the signal A6 is 0, another signal table is selected as the first use table. At this time, all signals included in the trace data may be registered in the other signal table.

In the present embodiment, the example in which the third storage unit 213 stores the first selection criteria are described. The selection unit 216 may select the first use table in accordance with the value of each signal included in the trace data X1 and the representative value of each signal determined for each group. In this example, the first selection criteria are not used for selecting the first use table. For example, the selection unit 216 calculates a similarity level between the trace data X1 and each group by using the representative value of each signal determined for each group in S201. The selection unit 216 selects as the first use table a signal table of a group of the highest similarity level that is calculated. The selection unit 216 may select as the first use tables signal tables of all groups of calculated similarity levels equal to or greater than a threshold. In the case in which a plurality of signal tables are selected by the selection unit 216, the processing operations indicated as S203 and S204 in FIG. 5 are performed for each of the selected signal tables.

Figure 10:
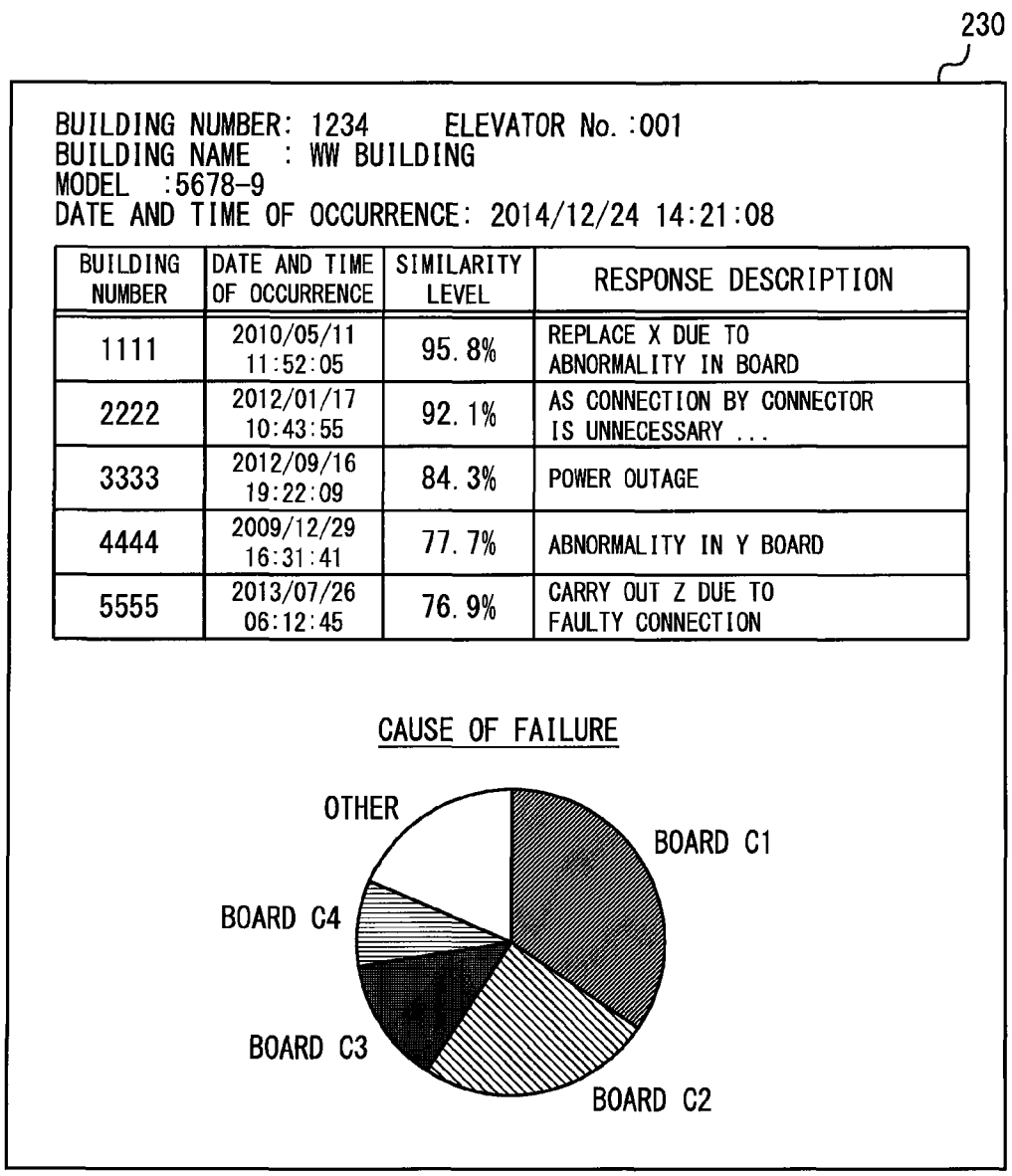
FIG. 10 is an illustration depicting another example of display of the display device.

In the present embodiment, the example in which sets of information that each identify a particular set of trace data are displayed at the display device 230 in order starting from a set of information of which the calculated similarity level is the highest. This is one example. For example, in the example indicated in FIG. 7, five incidents of higher similarity levels are displayed at the display device 230. At this time, concerning all the incidents, if the text "the board C1" or the text relating to the board C1 is written in the field of response description, a person who views the display may think that the cause of failure exists in only the board C1. When the actual cause of failure also exists in the board C2, part of failure may be overlooked. Thus, the display control unit 219 may determine the causes of failure in accordance with the text included in the response description and display, for example, a hundred events of higher similarity levels in an aggregated manner. At this time, by utilizing, for example, a synonym table, "C1" and "the board C1" may be determined as the same cause of failure. Events of similarity levels equal to or greater than a particular threshold may be displayed in an aggregated manner. FIG. 10 is an illustration depicting another example of display of the display device 230. FIG. 10 indicates an example in which the display representation in an aggregated manner is added to the display illustrated in FIG. 7. The example illustrated in FIG. 10 can present that not only the board C1 but also the board C2, the board C3, and the board C4 may be a cause of failure. The display control unit 219 may perform only displaying in an aggregated manner in S206.

Embodiment 2

In the embodiment 1, the example in which the number of signals necessary for calculation is limited and the load on the system is thus decreased is described. In the present embodiment, an example in which the number of sets of trace data necessary for calculation is limited and the load on the system is thus decreased is described. It should be noted that a function not described in the present embodiment is identical to any of the functions disclosed in the embodiment 1.

Figure 11:
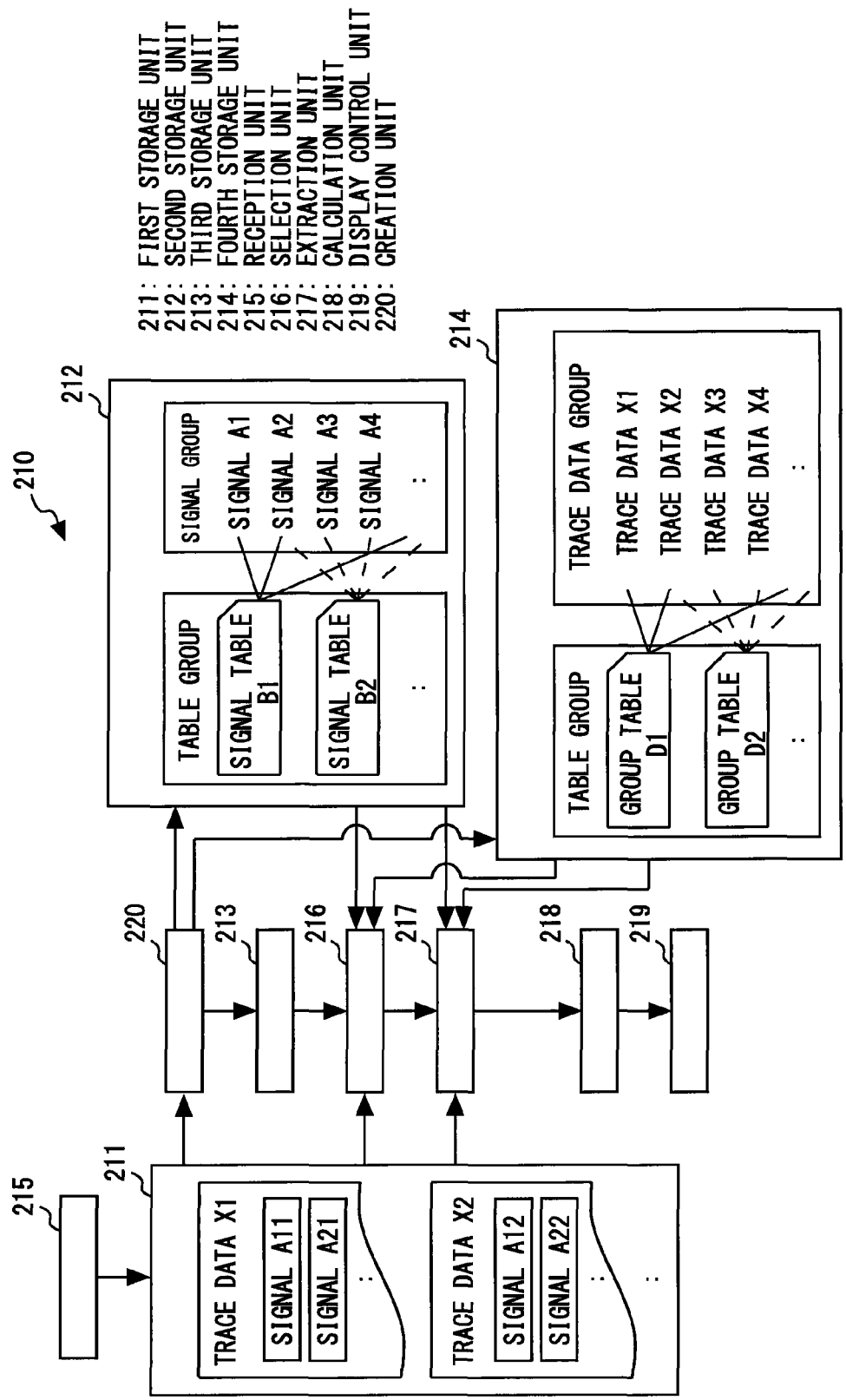
FIG. 11 is a diagram illustrating an example of the server according to an embodiment 2.
Figure 12:
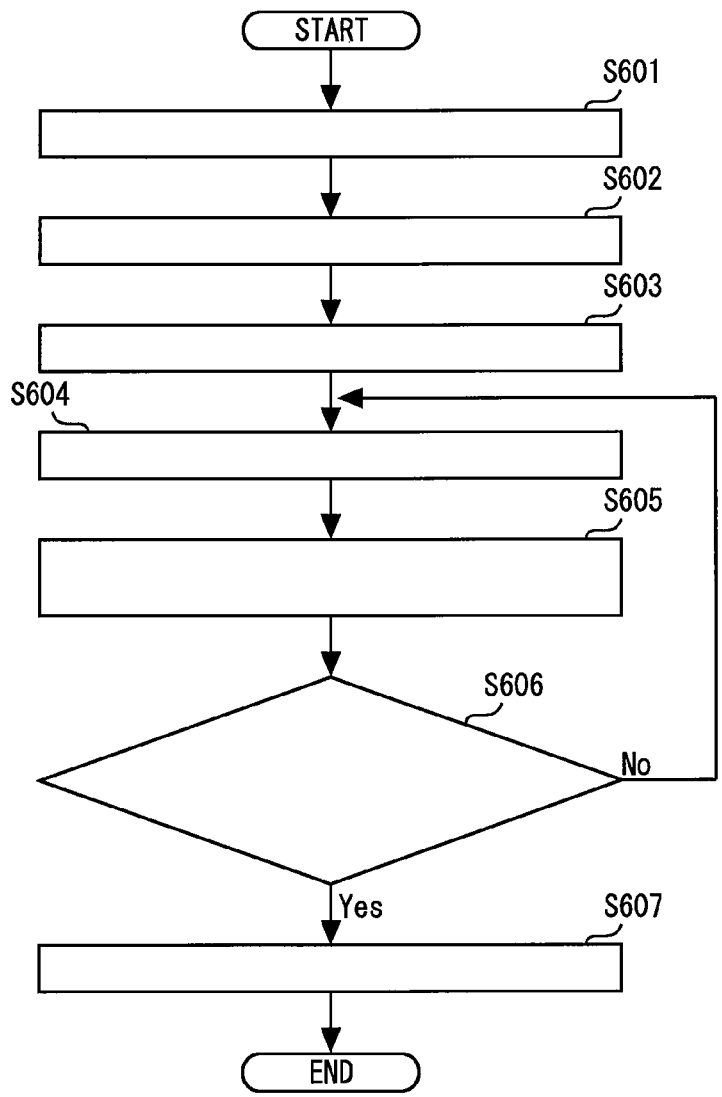
FIG. 12 is a flowchart illustrating an example of an operation of the retrieval system according to the embodiment 2.

FIG. 11 is a diagram illustrating an example of the server 210 according to an embodiment 2. Also in the present embodiment, the retrieval system is included in the monitoring system that monitors an elevator. The server 210 further includes, for example, a fourth storage unit 214 in addition to the first storage unit 211, the second storage unit 212, and the third storage unit 213. Hereinafter, also referring to FIG. 12, the functions and operations of the retrieval system according to the present embodiment is described. FIG. 12 is a flowchart illustrating an example of an operation of the retrieval system according to the embodiment 2. FIG. 12 depicts an example in which trace data similar to the trace data X1 is retrieved.

Firstly, the selection unit 216 selects the first use table from the plurality of signal tables stored in the second storage unit 212 (S601). The processing operation indicated as S601 is identical to the processing operation indicated as S201 in FIG. 5. Similarly to the example described in the embodiment 1, the selection unit 216 may select a plurality of signal tables as the first use tables.

Next, the selection unit 216 selects a group table to be used when the similarity level is calculated (S602). Hereinafter, the group table used when the similarity level is calculated is also referred to as a "second use table". The fourth storage unit 214 stores a plurality of group tables. The group table is a table used for specifying trace data to be used when the similarity level is calculated. As described above, the first storage unit 211 stores many sets of trace data. In each group table, part of trace data stored in the first storage unit 211 are registered. For example, the combination of sets of trace data registered in a group table varies among group tables. The selection unit 216 selects as the second use table a group table from the plurality of group tables stored in the fourth storage unit 214. The selection unit 216 may select a plurality of group tables as the second use tables.

The method employed by the selection unit 216 to select the second use table can be any method. For example, the third storage unit 213 stores second selection criteria. The second selection criteria are standards used when the selection unit 216 selects the second use table. The selection unit 216 selects the second use table in accordance with, for example, a value of a particular signal included in the trace data X1 and the second selection criteria stored in the third storage unit 213.

Next, the extraction unit 217 extracts from the trace data X1 the value of each signal registered in the first use table (S603). The processing operation indicated as S603 is identical to the processing operation indicated as S202 in FIG. 5.

Next, the extraction unit 217 selects a particular set of trace data other than the trace data X1 from sets of trace data stored in the first storage unit 211. At this time, the extraction unit 217 selects a set of trace data from sets of trace data registered in the second use table. For example, when the trace data X2 is registered in the second use table selected in S602, the extraction unit 217 selects the trace data X2 from the first storage unit 211.

The extraction unit 217 extracts from the selected trace data X2 the value of each signal registered in the first use table (S604). Next, the calculation unit 218 calculates a similarity level between the trace data X1 and the trace data selected in S604 (S605). The processing operations indicated as S604 and S605 are identical to the processing operations indicated as S203 and S204 in FIG. 5.

After a similarity level between the trace data X1 and a set of trace data is calculated in S605, it is determined whether the similarity level has been calculated with respect to all sets of trace data registered in the second use table (S606). When a similarity level between a particular set of trace data in sets of trace data registered in the second use table and the trace data X1 has not been calculated, the processing operations in S604 and S605 are performed for the particular set of trace data.

For example, the case in which the trace data X5 is registered in the second use table is considered. In this case, after a similarity level between the trace data X1 and the trace data X2 is calculated, the extraction unit 217 extracts from the trace data X5 the value of each signal registered in the first use table (S604). The calculation unit 218 calculates a similarity level between the trace data X1 and the trace data X5 in accordance with the value of each signal extracted from the trace data X1 by the extraction unit 217 and the value of each signal extracted from the trace data X5 by the extraction unit 217 (S605).

After a similarity level of the trace data X1 is calculated with respect to each of the sets of trace data registered in the second use table, the display control unit 219 causes the display device 230 to display the similarity levels calculated by the calculation unit 218 (S607).

In the example indicated in the present embodiment, the extraction unit 217 extracts the value of each signal registered in the first use table from each set of trace data registered in the second use table. The calculation unit 218 calculates a similarity level of the trace data X1 with respect to not all sets of trace data stored in the first storage unit 211. As a result, it is possible to decrease load when the similarity level of trace data is calculated. According to the example indicated in the present embodiment, it is possible to retrieve trace data similar to, for example, the trace data X1 in a shorter time period.

In the present embodiment, the example in which the selection unit 216 selects both the first use table and the second use table is described. In the case in which the selection unit 216 selects only the second use table, a certain level of advantageous effect can still be expected.

In this case, the selection unit 216 does not select the first use table. The selection unit 216 does not perform the processing operation in S601 and selects the second use table in the fourth storage unit 214 formed as a table storage unit (S602). For example, the selection unit 216 selects the second use table in accordance with a value of a particular signal included in the trace data X1 and the second selection criteria stored in the third storage unit 213. Next, the extraction unit 217 extracts the value of each signal of the particular kinds of signals from the trace data X1 (S603). Additionally, the extraction unit 217 selects a set of trace data from the sets of trace data registered in the second use table. The extraction unit 217 extracts the value of each signal of the particular kinds of signals from the selected set of trace data (S604). The calculation unit 218 then calculates a similarity level between the trace data X1 and the trace data selected in S604 in accordance with the values of respective signals extracted by the extraction unit 217 (S605).

After a similarity level between the trace data X1 and a set of trace data is calculated in S605, it is determined whether the similarity level has been calculated with respect to all sets of trace data registered in the second use table (S606). When a similarity level between a particular set of trace data in sets of trace data registered in the second use table and the trace data X1 has not been calculated, the processing operations in S604 and S605 are performed for the particular set of trace data. In this manner, similarity levels of the trace data X1 are calculated with respect to all sets of trace data registered in the second use table.

In the present embodiment, the example in which the fourth storage unit 214 previously stores group tables is described. The group tables are stored, for example, manually by the designer of the elevator 100 or the maintenance staff 500 in the fourth storage unit 214. As another example, the creation unit 220 may create group tables. The creation unit 220 creates a group table in accordance with a plurality of sets of trace data stored in the first storage unit 211. The fourth storage unit 214 stores the group table created by the creation unit 220.

The creation unit 220 may create a group table by employing a method identical to the method for creating a signal table. For example, the creation unit 220 calculates similarity levels with respect to all pairs in sets of trace data stored in the first storage unit 211. The creation unit 220 performs grouping for trace data in accordance with the calculated similarity levels and repeats calculating similarity levels with respect to all pairs. By performing such group merging processing, the creation unit 220 can generate a plurality of groups in which a representative value of each signal is determined. For example, the creation unit 220 registers, in a table, trace data included in one group, so that the creation unit 220 creates a group table corresponding to the one group. The creation unit 220 may create a group table by employing another method.

Similarly, in the present embodiment, the example in which the third storage unit 213 previously stores the second selection criteria is described. The second selection criteria are stored in the third storage unit, for example, manually by the designer of the elevator 100 or the maintenance staff 500. As another example, the creation unit 220 may create the second selection criteria. The creation unit 220 creates the second selection criteria in accordance with a plurality of sets of trace data stored in the first storage unit 211. The third storage unit 213 stores the second selection criteria created by the creation unit 220.

For example, the creation unit 220 creates the second selection criteria by employing a method identical to the method for creating the first selection criteria. The creation unit 220 calculates similarity levels with respect to all pairs in sets of trace data stored in the first storage unit 211. The creation unit 220 performs grouping for trace data in accordance with the calculated similarity levels. The creation unit 220 can create the second selection criteria for each group by determining the representative value of each signal with respect to each group. The creation unit 220 may create the second selection criteria by employing another method.

In the present embodiment, the example in which the third storage unit 213 stores the second selection criteria are described. The selection unit 216 may select the second use table in accordance with the value of each signal included in the trace data X1 and the representative value of each signal determined for each group. In this example, the second selection criteria are not used for selecting the second use table. For example, the selection unit 216 calculates a similarity level between the trace data X1 and each group by using the representative value of each signal determined for each group in S602. The selection unit 216 selects as the second use table a group table corresponding to a group of the highest similarity level that is calculated. The selection unit 216 may select as the second use tables group tables corresponding to all groups of calculated similarity levels equal to or greater than a threshold.

Embodiment 3

FIG. 13 is a diagram illustrating an example of the server 210 according to an embodiment 3. Also in the present embodiment, the retrieval system is included in the monitoring system that monitors an elevator. The server 210 further includes, for example, a check unit 221 in addition to the reception unit 215, the selection unit 216, the extraction unit 217, the calculation unit 218, and the display control unit 219. It should be noted that a function not described in the present embodiment is identical to any of the functions disclosed in the embodiment 1 or 2. For example, the server 210 may further include the creation unit 220. The server 210 may further include the fourth storage unit. Hereinafter, also referring to FIG. 14, the functions and operations of the retrieval system according to the present embodiment is described. FIG. 14 is a flowchart illustrating an example of an operation of the retrieval system according to the embodiment 3.

For example, the case in which the first storage unit 211 newly stores the trace data X1 and an operation is performed by following the processing flow illustrated in FIG. 5 is considered. By performing the operation following the processing flow illustrated in FIG. 5, for example, the signal table B1 is selected as the first use table in S201. It is assumed that a hundred signals No. 1 to 100 are included in the trace data X1 and ten signals No. 1 to 10 are registered in the first use table. The trace data X1 is newly stored in the first storage unit 211, and then, a similarity level between the trace data X1 and another set of trace data is calculated by using the signals No. 1 to 10 (Yes in S205).

The check unit 221 determines whether adjustment is necessary for the first use table, that is, the signal table B1 in the example described above. When a signal needs to be added to the signal table B1, the check unit 221 registers the new signal in the signal table B1. When a signal needs to be deleted from the signal table B1, the check unit 221 deletes the signal from the signal table B1.

The check unit 221 extracts the values of all signals from the trace data X1 (S701). Next, the check unit 221 selects a particular set of trace data other than the trace data X1 from sets of trace data stored in the first storage unit 211. For example, the check unit 221 selects the trace data X2 from the first storage unit 211. The check unit 221 extracts the values of all signals from the selected trace data X2 (S702).

The check unit 221 calculates a similarity level between the trace data X1 and the trace data selected in S702 (S703). For example, the check unit 221 calculates a similarity level between the trace data X1 and the trace data X2. The check unit 221 calculates a similarity level in accordance with the value of each signal extracted from the trace data X1 in S701 and the value of each signal extracted from the trace data X2 in S702 by employing a method identical to the method employed by the calculation unit 218 to calculate a similarity level.

After a similarity level between the trace data X1 and a set of trace data is calculated, it is determined whether the similarity level has been calculated with respect to all sets of trace data (S704). When a similarity level between a particular set of trace data and the trace data X1 has not been calculated, the processing operations in S702 and S703 are performed for the particular set of trace data.

For example, after a similarity level between the trace data X1 and the trace data X2 is calculated, the check unit 221 extracts the values of all signals from the trace data X3 (S702). The check unit 221 calculates a similarity level between the trace data X1 and the trace data X3 in accordance with the value of each signal extracted from the trace data X1 in S701 and the value of each signal extracted from the trace data X3 in S702 (S703). In this manner, a similarity level between the trace data X1 and another set of trace data is calculated by using, for example, the signals No. 1 to 100.

As described above, the calculation unit 218 calculates the similarity level by using the signals registered in the first use table, that is, some of all signals. By contrast, the check unit 221 calculates the similarity level by using all signals. When it is determined as Yes in S704, the check unit 221 compares the similarity level calculated by using the signals registered in the first use table and the similarity level calculated by using all signals (S705).

TABLE 6

| Trace data | Use signals No. 1 to 10 | Use signals No. 1 to 100 | Signal A1 | A2 | A3 | ... |
|---|---|---|---|---|---|---|
| X2 | 50% | 70% | 0 | 1 | 1 | |
| X3 | 50% | 50% | 0 | 1 | 0 | |
| X4 | 50% | 50% | 0 | 1 | 0 | |
| X5 | 50% | 50% | 1 | 1 | 0 | |

(Similarity level to X1)

Table 6 indicates comparison results of the similarity levels calculated by using the signals No. 1 to 10 and the similarity levels calculated by using the signals No. 1 to 100. In the example indicated in Table 6, the similarity levels calculated by using the signals No. 1 to 10 are all 50%. By contrast, when the similarity level is calculated by using the signals No. 1 to 100, the similarity levels of the trace data X3 to X5 are 50% and same as the similarity levels calculated by using the signals No. 1 to 100, while the similarity level of the trace data X2 is 70% and greater than the similarity levels calculated by using the signals No. 1 to 100. The change in the similarity level of the trace data X2 is not identical to the changes in the similarity level of the other sets of trace data.

The check unit 221 detects, as the signal that affects the similarity level, a signal the value of which has a tendency similar to the change in the similarity level. In the example indicated in Table 6, the value of the signal A3 is the same among the trace data X3 to X5. In contrast, the value of the signal A3 in the trace data X2 is not identical to the value of the signal A3 in the other sets of trace data. Thus, the check unit 221 detects the signal A3 as the signal that affects the similarity level.

The check unit 221 adjusts, by using the detected signal, the signal table B1 selected as the first use table. For example, when the signal A3 is not registered in the signal table B1, the check unit 221 adds the signal A3 to the signal table B1. In the case in which adding the signal A3 to the signal table B1 causes a need to adjust the first selection criteria, the check unit 221 adjusts the first selection criteria such that the addition of the signal A3 is reflected in the criteria.

The check unit 221 may delete a signal from a signal table by employing a method identical to the method for adding a signal to a signal table. For example, the check unit 221 identifies a particular set of trace data in which the similarity level calculated by using the signals No. 1 to 100 is lower than the similarity level calculated by using the signals No. 1 to 10. The check unit 221 then detects a signal that affects the change in the similarity level.

Update of a signal table performed by the check unit 221 is performed during, for example, nighttime in which the load on the system is light. In the example indicated in the present embodiment, when signals to be used for calculating the similarity level are excessively reduced, it is possible to add at a later time a signal to be registered in a signal table. Furthermore, in the case in which a new kind of failure occurs, it is possible to automatically change a signal table to match the failure. By applying the procedure described above, when a new kind of signal is added, it is possible to automatically register the new signal in a signal table.

The check unit 221 may determine, by employing a method identical to the example described above, whether adjustment is necessary for a group table selected as the second use table. When a particular set of trace data needs to be added to the group table, the check unit 221 registers the new trace data in the group table. When a particular set of trace data needs to be deleted from the group table, the check unit 221 deletes the trace data from the group table.

When the first selection criteria or the second selection criteria are not stored in the third storage unit 213, the check unit 221 may perform the group merging processing described in the embodiment 2.

Figure 15:
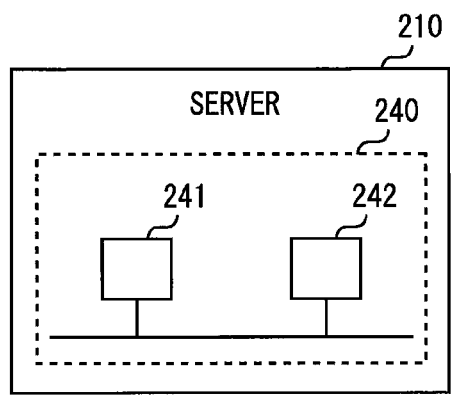
FIG. 15 is a diagram illustrating an example of hardware resources of the server.

In the present embodiment, each of the units indicated by the reference numerals 211 to 221 represent a function included in the server 210. FIG. 15 is a diagram illustrating an example of hardware resources of the server 210. As hardware resources, the server 210 includes, for example, processing circuitry 240 including a processor 241 and a memory 242. The memory 242 implements the functions of the first storage unit 211 to the fourth storage unit 214. The server 210 implements, by executing a program stored in the memory 242 with the use of the processor 241, the function of each of the units indicated by the reference numerals 215 to 221.

The processor 241 is also referred to as a central processing unit (CPU), a central processor, a processing device, an arithmetic device, a microprocessor, a microcomputer, or a DSP. As the memory 242, a semiconductor memory, a magnetic disk, a flexible disk, an optical disk, a compact disc, a mini disk, or a DVD can be used. Applicable semiconductor memories include, for example, a RAM, a ROM, a flash memory, an EPROM, an EEPROM, and the like.

Figure 16:
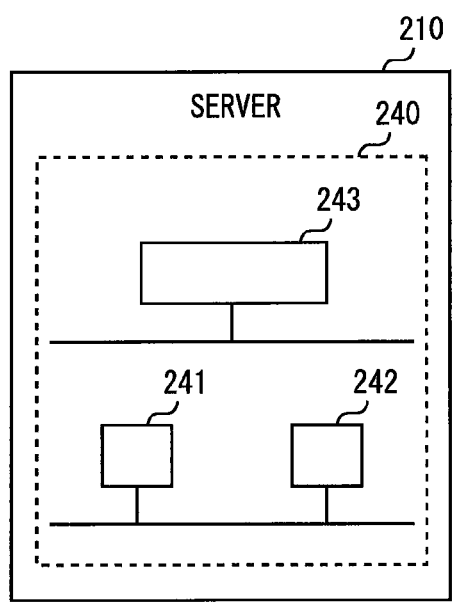
FIG. 16 is a diagram illustrating another example of hardware resources of the server.

FIG. 16 is a diagram illustrating another example of hardware resources of the server 210. In the example illustrated in FIG. 16, the server 210 includes, for example, the processing circuitry 240 including the processor 241, the memory 242, and dedicated hardware 243. FIG. 16 indicates an example in which the dedicated hardware 243 implements one or some of the functions included in the server 210. The dedicated hardware 243 may implement all the functions included in the server 210. As the dedicated hardware 243, a single circuit, a composite circuit, a programmed processor, a parallel-programmed processor, an ASIC, a FPGA, or any combination thereof can be used.

In the embodiments, the example in which the server 210 includes the main functions of the retrieval system. For example, the operator 311 in the information center 300 can access the data center 200 by using the monitoring terminal 310 and cause the monitoring terminal 310 to display the retrieval result. The maintenance staff 500 can access the data center 200 by using the portable terminal 501 and cause the portable terminal to display the retrieval result.

One or some of the functions included in the server 210 in the examples described above may be included in the information center 300. One or some of the functions included in the server 210 may be included in the portable terminal 501 of the maintenance staff 500 or the elevator 100. For example, the monitoring terminal 310, the portable terminal 501, or the monitoring device 107 may include the function of the selection unit 216.

As another example, the monitoring device 107 of each elevator 100 may have the function of the selection unit 216, the function of the extraction unit 217, and the function of the calculation unit 218. Additionally, the server 210 may have another calculation function. The server 210 calculates the similarity level by using all signals included in trace data with the use of this calculation function. This means that the server 210 performs processing operations identical to the processing operations indicated as S701 to S704 in FIG. 14. In this example, it is possible to immediately provide from the elevator 100 information of similarity level obtained by a small amount of calculation for the maintenance staff 500 having arrived at the site. Moreover, it is possible to afterward provide from the server 210 information of similarity level that requires a large amount of calculation for the maintenance staff 500. The maintenance staff 500 can carry out repair work while comparing both kinds of information at the site. In this example, when the monitoring terminal 310 in the information center 300 has the function of the selection unit 216, the function of the extraction unit 217, and the function of the calculation unit 218, the same effects can be achieved.

As another example, both the data center 200 and the information center 300 may have the function of the selection unit 216, the function of the extraction unit 217, and the function of the calculation unit 218. Specifically, similarly to the examples described above, the server 210 in the data center 200 includes the selection unit 216, the extraction unit 217, and the calculation unit 218. The monitoring terminal 310 in the information center 300 includes a selection unit having the same function as that of the selection unit 216, an extraction unit having the same function as that of the extraction unit 217, and a calculation unit having the same function as that of the calculation unit 218.

The information center 300 is established in each particular area. For example, the monitoring terminal 310 receives trace data from the elevators 100 in the area. Sets of trace data received from the elevators 100 in the area are accumulated in the monitoring terminal 310. As a result, signal tables that match the environment of the area are stored in the monitoring terminal 310.

By contrast, the server 210 receives trace data from the elevators 100 in a plurality of areas. For example, the server 210 receives trace data from the elevators 100 in all areas. As a result, the server 210 stores average signal tables. The server 210 stores signal tables different from the signal tables stored in the monitoring terminal 310.

In this example, in the information center 300, it is possible to calculate the similarity level by using the signal tables that match the environment of the corresponding area. By contrast, the server 210 can calculate the similarity level by using the average signal tables. The maintenance staff 500 can carry out repair work while comparing both kinds of information at the site. Furthermore, in the case in which a new type of the elevator 100 is introduced in a particular area, it is possible to implement an application in which signal tables of the particular area are adjusted with reference to signal tables of another area in which the type of the elevator 100 has been already introduced.

As hardware resources, the monitoring terminal 310 includes, for example, processing circuitry including a processor and a memory as in the example illustrated in FIG. 15. The monitoring terminal 310 may include processing circuitry including a processor, a memory, and dedicated hardware as in the example illustrated in FIG. 16. For example, the monitoring terminal 310 implements each of the functions described above by executing a program stored in the memory with the use of the processor. The same holds for the portable terminal of the maintenance staff 500 and the monitoring device 107.

INDUSTRIAL APPLICABILITY

The present invention can be applied to a system for retrieving a signal group similar to a given signal group.

REFERENCE SIGNS LIST

100 elevator, 101 car, 102 counterweight, 103 main rope, 104 driving sheave, 105 motor, 106 control panel, 107 monitoring device, 108 communication device, 200 data center, 210 server, 211 first storage unit, 212 second storage unit, 213 third storage unit, 214 fourth storage unit, 215 reception unit, 216 selection unit, 217 extraction unit, 218 calculation unit, 219 display control unit, 220 creation unit, 221 check unit, 230 display device, 240 processing circuitry, 241 processor, 242 memory, 243 dedicated hardware, 300 information center, 310 monitoring terminal, 311 operator 401 IP network, 402 IP network, 500 maintenance staff, 501 portable terminal

The invention claimed is:

1. A retrieval system for retrieving data from an elevator, the retrieval system comprising:
  processing circuitry configured
    to store a plurality of signal groups including a first signal group and a second signal group, the second signal group including particular kinds of signals included in a first signal group, each signal group in each of the plurality of signal groups including signals having been captured from trace data for the elevator at different times;
    to store a plurality of signal tables in each of which some of the particular kinds of signals are registered;
    to select a first use table from the plurality of signal tables in accordance with a value of a signal included in the first signal group, the first use table corresponding to a failure mode of the elevator;
    to extract, from the first signal group and the second signal group, a value of only each signal registered in the first use table; and
    to calculate a similarity level between the first signal group and the second signal group in accordance with the value of each signal extracted from the first signal group and the value of each signal extracted from the second signal group, wherein the plurality of signal groups each include the particular kinds of signals, and the processing circuitry is further configured
- to calculate a similarity level between the first signal group and each of the plurality of signal groups, the similarity level indicating a similarity between a first status of the elevator indicated by the first signal group and other statuses of the elevator at different times indicated by each other signal group, and
- to determine, in accordance with the similarity level calculated by using signals registered in the first use table and a similarity level calculated by using the particular kinds of signals, whether adjustment is necessary for a signal table selected as the first use table.

2. The retrieval system according to claim 1, wherein: the circuitry is configured
- to create a signal table, and
- to store the created signal table as one of the plurality of signal tables.

3. The retrieval system according to claim 1, wherein: the circuitry is configured
- to store selection criteria, and
- to select the first use table in accordance with the selection criteria and the value of the signal included in the first signal group.

4. The retrieval system according to claim 3, wherein: the circuitry is configured
- to create the selection criteria, and
- to store the created selection.

5. A retrieval system for retrieving data from an elevator, the retrieval system comprising:
processing circuitry configured
- to store a plurality of signal groups including a first signal group and a second signal group, the second signal group including particular kinds of signals included in a first signal group, each signal group in each of the plurality of signal groups including signals having been captured from trace data for the elevator at different times;
- to store a plurality of signal tables in each of which some of the particular kinds of signals are registered;
- to select a first use table from the plurality of signal tables in accordance with a value of a signal included in the first signal group, the first use table corresponding to a failure mode of the elevator;
- to extract, from the first signal group and the second signal group, a value of only each signal registered in the first use table;
- to calculate a similarity level between the first signal group and the second signal group in accordance with the value of each signal extracted from the first signal group and the value of each signal extracted from the second signal group; and
- to create a signal table, wherein the plurality of signal groups each include the particular kinds of signals, and
the circuitry is configured
- to classify the plurality of signal groups into a plurality of groups, determine a representative value of each signal with respect to each of the plurality of groups, and create the signal table for each of the plurality of groups in accordance with determination results, and
- to store the created signal table as one of the plurality of signal tables.

6. The retrieval system according to claim 5, wherein: the circuitry is configured
- to calculate a similarity level between the first signal group and each of the plurality of signal groups, the similarity level indicating a similarity between a first status of the elevator indicated by the first signal group and other statuses of the elevator at different times indicated by each other signal group, and
- to determine, in accordance with the similarity level calculated by using signals registered in the first use table and a similarity level calculated by using the particular kinds of signals, whether adjustment is necessary for a signal table selected as the first use table.

* * * * *